(12) United States Patent
Park et al.

(10) Patent No.: US 7,833,297 B2
(45) Date of Patent: Nov. 16, 2010

(54) POLISHING PAD CONTAINING INTERPENETRATING LIQUIFIED VINYL MONOMER NETWORK WITH POLYURETHANE MATRIX THEREIN

(75) Inventors: In-Ha Park, Ulsan (KR); Ju-Yeol Lee, Kyungki-do (KR); Sung-Min Jun, Choonchungbook-do (KR)

(73) Assignee: SKC Co., Ltd., Kyungki-do (KR)

( * ) Notice: Subject to any disclaimer, the term of this patent is extended or adjusted under 35 U.S.C. 154(b) by 515 days.

(21) Appl. No.: 11/989,372

(22) PCT Filed: Jul. 19, 2006

(86) PCT No.: PCT/KR2006/002826

§ 371 (c)(1),
(2), (4) Date: Jan. 22, 2008

(87) PCT Pub. No.: WO2007/011158

PCT Pub. Date: Jan. 25, 2007

(65) Prior Publication Data

US 2009/0077899 A1    Mar. 26, 2009

(30) Foreign Application Priority Data

Jul. 20, 2005    (KR) ...................... 10-2005-0065756

(51) Int. Cl.
  *C09K 3/14*    (2006.01)
  *B24D 11/00*    (2006.01)
(52) U.S. Cl. ......................... 51/298; 451/526
(58) Field of Classification Search ........................ None
  See application file for complete search history.

(56) References Cited

U.S. PATENT DOCUMENTS

| 4,927,432 A | 5/1990 | Budinger et al. |
| 5,209,760 A | 5/1993 | Wiand |

FOREIGN PATENT DOCUMENTS

| EP | 1 108 500 A1 | 6/2001 |
| JP | 2000218551 | 8/2000 |
| JP | 2001198796 | 7/2001 |
| JP | 2001239453 | 9/2001 |
| JP | 2001239454 | 9/2001 |
| JP | 2000071168 | 3/2003 |
| JP | 2005059179 | 3/2005 |
| WO | WO 94/04599 | 3/1994 |

*Primary Examiner*—Melvin C Mayes
*Assistant Examiner*—Sarah Van Oudenaren
(74) *Attorney, Agent, or Firm*—Abelman, Frayne & Schwab

(57) ABSTRACT

Provided is a polyurethane polishing pad. More specifically, the present invention provides a polyurethane polishing pad having an interpenetrating network structure of a vinyl polymer with a polyurethane matrix via radical polymerization and having no pores and gas bubbles. The polyurethane polishing pad having an interpenetrating network structure of a vinyl polymer exhibits uniform dispersibility and reduced changes in hardness of the urethane pad due to heat and slurry, thereby resulting in no deterioration of polishing efficiency due to abrasion heat and solubility in the slurry upon polishing, and also enables a high-temperature polishing operation. Further, according to the present invention, the interpenetrating network structure leads to an improved polishing rate and abrasion performance, thereby significantly increasing the service life of the polishing pad.

12 Claims, 2 Drawing Sheets

(a)

(b)

[Fig. 1]
(a)
(b)
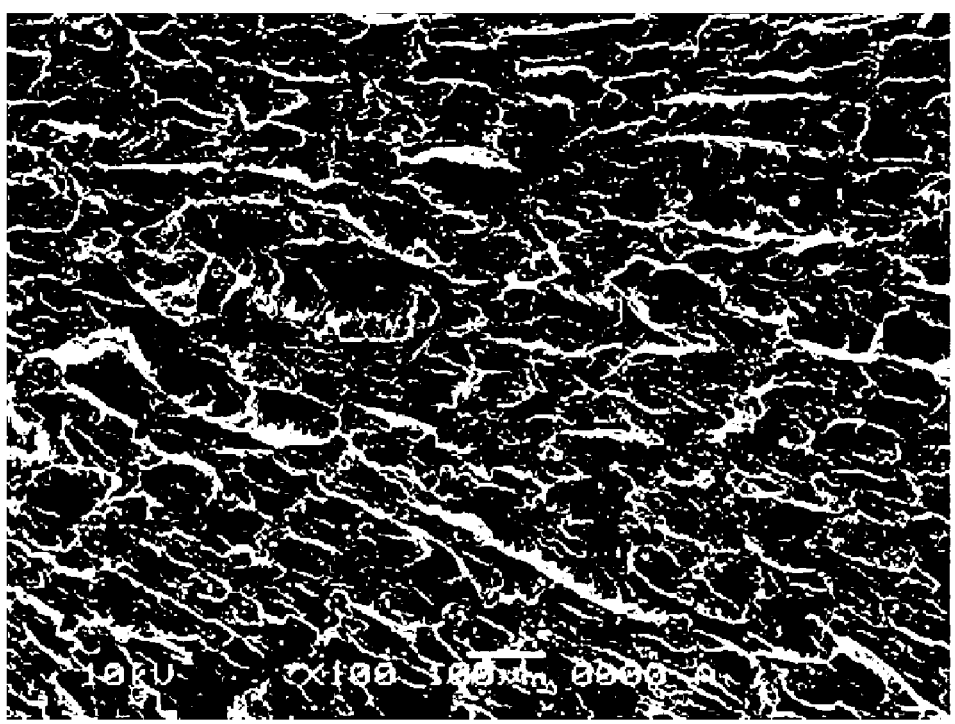

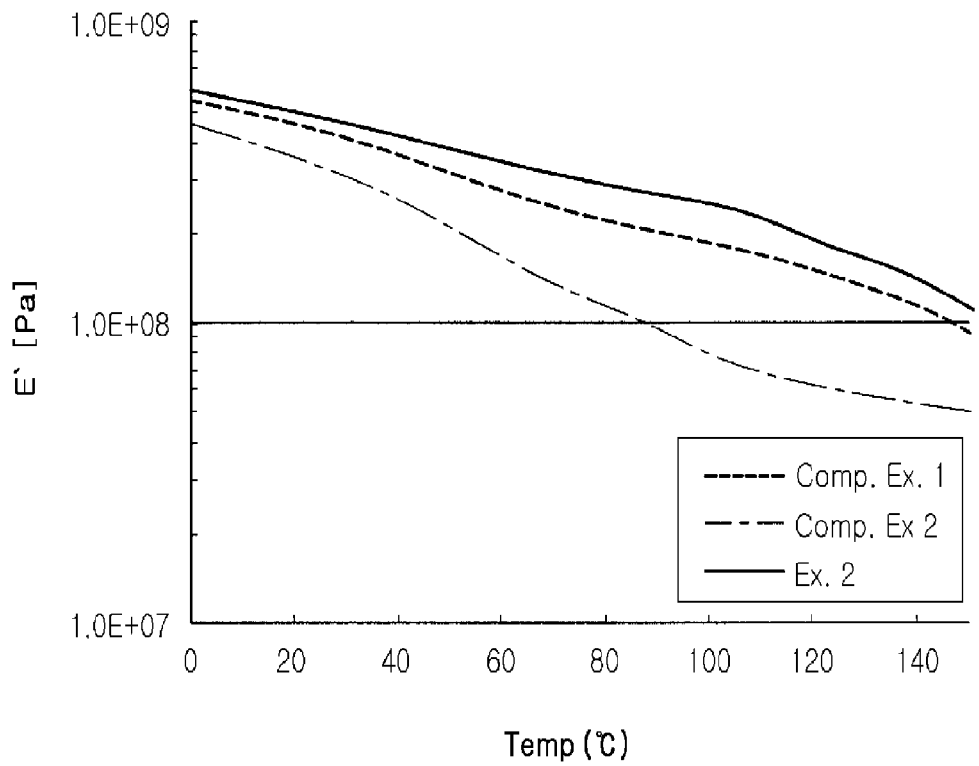
[Fig. 2]
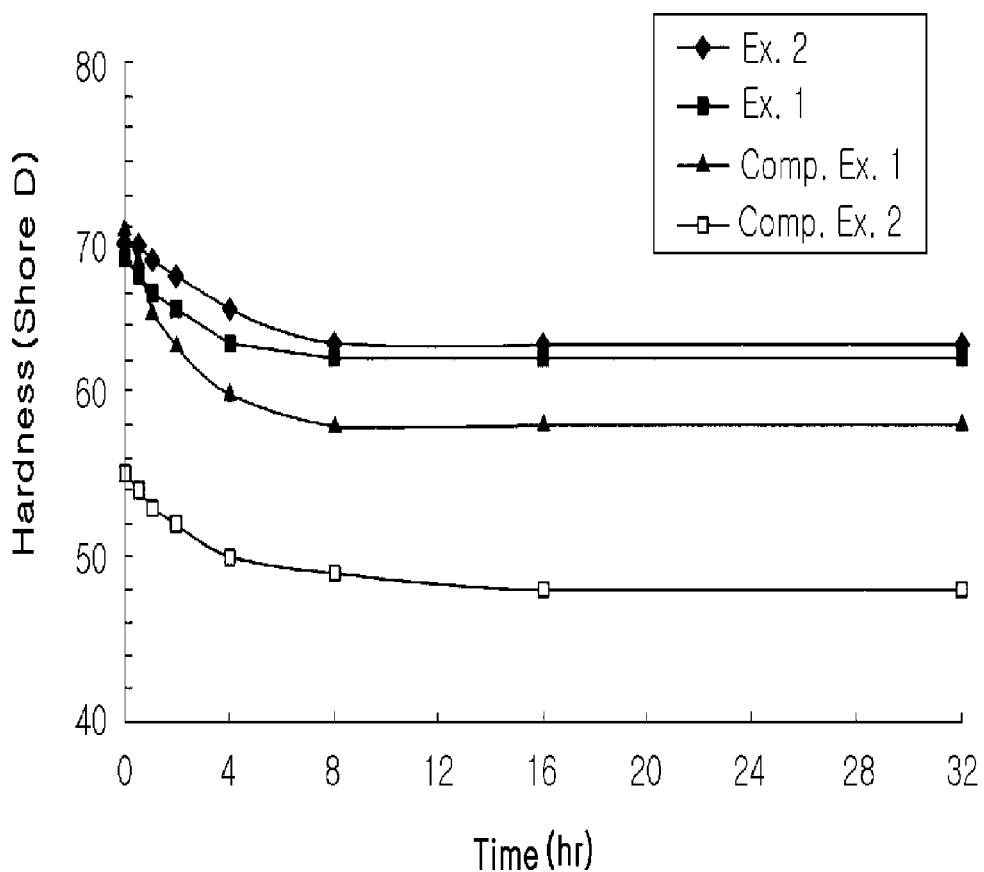
[Fig. 3]

POLISHING PAD CONTAINING INTERPENETRATING LIQUIFIED VINYL MONOMER NETWORK WITH POLYURETHANE MATRIX THEREIN

TECHNICAL FIELD

The present invention relates to a polyurethane polishing pad. More specifically, the present invention relates to a polyurethane polishing pad having an interpenetrating network structure of a vinyl polymer with a polyurethane matrix and having no pores and gas bubbles.

BACKGROUND ART

Advancement in technologies has led to demand for high-data processing performance of semiconductor devices, and hence a great deal of research has been directed to development of high-speed semiconductors to cope with such a trend. High-integration of semiconductors is necessary to satisfy high-speed requirements in semiconductors, and consequently the planarization of semiconductor wafer has become an essential factor for the realization of semiconductor integration to a desired level. Such requirements for the realization of high-speed semiconductors have led to incorporation of the polishing process into the semiconductor manufacturing processes. The polishing pad is a consumable pad that is used in the planarization process of materials requiring a high degree of surface flatness as described above, and is therefore widely used in planarization of various materials requiring a high degree of surface flatness, such as glass, mirror and dielectric/metal composite, as well as semi-conductor integrated circuits.

Polishing generally consists of the controlled wear of an initially rough surface to produce a smooth specular finished surface. This is commonly accomplished by rubbing a pad against the surface of the article to be polished (the workpiece) in a repetitive, regular motion while a solution containing a suspension of fine particles (the slurry) is present at the interface between the polishing pad and the workpiece.

Examples of conventional polishing pads may include felted or woven natural fibers such as wool, urethane-impregnated felted polyester or urethane pads filled with various kinds of fillers, or urethane pads containing no filler but having micro-holes or gas bubbles or pores capable of storing the polishing slurry.

As prior arts relating to the polishing pads, mention may be made of a polishing pad utilizing protruded fibers in conjunction with voids, via incorporation of urethane into polyester felt (U.S. Pat. No. 4,927,432), IC-series, MH-series and LP-series polishing pads having a surface structure made up of semicircular depressions by incorporation of hollow spherical elements or pores and gas bubbles into polyurethane (manufactured by Rohm and Haas), a polishing pad having a characteristic surface structure made up of protrusions and concavities with or without use of filler particles (U.S. Pat. No. 5,209,760), a polishing pad comprising high-pressure gas-containing hollow fine spheres or water-soluble polymer powder dispersed in a matrix resin such as polyurethane: (Japanese Patent No. 3013105 and Japanese Patent Publication Laid-open No. 2000-71168). Therefore, techniques applied to the polishing pads as described above are primarily based on incorporation of different kinds of materials (such as pores, gas bubbles, fillers, felt and non-woven fabric) into the polyurethane matrix via a variety of methods.

The polishing pad utilizing protruded fibers together with voids via incorporation of urethane into polyester felt, as disclosed in U.S. Pat. No. 4,927,432, exhibits superior planarity, but disadvantageously suffers from a slow polishing rate due to low hardness of the pad itself. IC-series, MH-series and LP-series polishing pads having a surface structure made up of semicircular depressions by incorporation of hollow spherical elements or pores and gas bubbles into polyurethane, commercially available from Rohm and Haas, are currently widely used due to superior polishing rate and planarity, but incorporation of heterogeneous hollow spherical elements or pores/gas bubbles dis-advantageously results in the difficulty of uniform dispersion, thereby leading to a difference in density between the polyurethane matrix and incorporated materials, and the flatness error is gradually increased as the polishing progresses. The polishing pad having a characteristic surface structure consisting of protrusions and concavities with/without use of filler particles, as disclosed in U.S. Pat. No. 5,209,760, also suffers from difficulty in uniform dispersion of heterogeneous filler particles. Further, the polishing pad comprising high-pressure gas-containing hollow fine spheres or water soluble polymer powder dispersed in a matrix resin such as polyurethane, as disclosed in Japanese Patent No. 3013105 and Japanese Patent Publication Laid-open No. 2000-71168, disadvantageously suffers from difficulty of dispersion associated with mixing of the water-soluble polymer powder, and decreased hardness of the pad surface as the polishing process progresses, thus resulting in changes in the polishing rate.

In addition, a polishing pad in a uniform urethane non-foam system (for example, IC-2000 manufactured by Rodel) may be mentioned wherein polishing performance is imparted to the pad using surface texture. However, such a polishing pad suffers from a problem of scratches occurring on the polished surface of a workpiece, and therefore is not widely used at present. Further, the polishing pad in the non-foam system cannot maintain sufficient amounts of the polishing slurry on the surface of the pad at the time of polishing, and is thus not preferable from the viewpoint of polishing rate.

That is, as a principal polymer matrix obtained by blending, mixing, solidification and impregnation of pores, gas bubbles, fillers and non-woven fabric, a pad having desired elasticity and hardness and using a polyurethane matrix taking into consideration manufacturability has been primarily used as the polishing pad. To this end, pads, which include the above-mentioned heterogeneous materials, pores or gas bubbles, or heterogeneous materials capable of forming concavities during the chemical-mechanical polishing (commonly abbreviated as CMP) process in the polyurethane matrix, are commercially available and are widely used in planarization processes of various semiconductor materials or planarization processes of glass surface.

However, inclusion of pores or gas bubbles in the polyurethane matrix disadvantageously leads to an increase in density difference due to non-uniformity of dispersion, which consequently brings some differences in the polishing performance from lot to lot and also density variation within the corresponding lots from part to part, and an increase in the flatness error as the polishing operation progresses. Pads containing water-soluble fillers in the polyurethane matrix are known to form pores and concavities by polishing slurry, thus improving the polishing performance via the use of the-thus formed pores and concavities. However, these pads have shortcomings in that hardness of the pad is decreased with a further progress of the polishing operation, thereby decreasing the polishing rate, and wearing of the pad leads to the shortened service life of the pad.

In addition, there may be mentioned a polishing pad containing laser-formed micro holes in a uniform urethane matrix which is commercially available from the present applicant.

DISCLOSURE OF INVENTION

Technical Problem

Therefore, the present invention has been made in view of the above problems, and it is an object of the present invention to provide a polyurethane polishing pad having an interpenetrating network structure of a liquid vinyl monomer with a polyurethane matrix via radical polymerization, in order to overcome the problems suffered by conventional urethane pads and thereby in order to achieve more stable polishing, whereby the pad is rendered more stable against heat and slurry and therefore is not substantially susceptible to frictional heat and contact with slurry upon performing a polishing operation, and has improved polishing rate and wear rate characteristics.

It is another object of the present invention to provide a polishing pad having a significantly prolonged service life by solving the instability of dispersion which is the most significant problem associated with addition of heterogeneous fillers or fine elements and by remarkably improving abrasion performance of the pad.

Technical Solution

In accordance with an aspect of the present invention, the above and other objects can be accomplished by the provision of a pore/gas bubble-free, polyurethane polishing pad having an interpenetrating network structure, wherein vinyl polymer obtained through radical polymerization of vinyl monomer and optionally of vinyl oligomer, which are liquid at a room temperature, is interpenetrated into and cross-linked with polyurethane during polyurethane polymerization of main material and curing agent, by addition of the vinyl monomer and optionally of the vinyl oligomer into at least one of the main material and the curing agent.

The vinyl monomer is a compound having at least one unsaturated group, and is allowed to undergo polymer polymerization simultaneously with polyurethane reaction, using a radical catalyst.

Examples of the vinyl monomers having at least one unsaturated group include vinyl monomers such as styrene, acrylonitrile, methylacrylonitrile, alpha-methylstyrene, methylstyrene and butylstyrene; unsaturated monocarboxylic acids such as acrylic acid, methacrylic acid, fumaric acid and itaconic acid; and acrylates such as methylacrylate, 2-hydroxypropylacrylate, methyl methacrylate, 2-hydroxymethyl methacrylate and isopropyl methacrylate.

The radical catalyst, which is used for the polymerization of the vinyl monomer having unsaturated group(s) into a polymer, may include peroxides, percarbonates and azo compounds. As specific examples of the radical catalyst, mention may be made of benzoyl peroxide, decanoyl peroxide, t-butyl peroctoate, di-t-butyl peroxide, cumene hydroperoxide, propylhydroperoxide, isopropyl hydroperoxide, t-amyl-2-ethyl-hexanoate, 2,2'-azo-bis-(iso-butyronitrile) and 2,2'-azo-bis-(2-methylbutane-nitrile).

In general, polymerization of the monomers into polymers employs monomers having a half life of not more than 1 min at a polymerization temperature, and the monomers are used in an amount of 0.5 to 5% by weight, based on the total weight of reaction materials.

In addition, it is possible to induce binding of the-thus obtained polymer with a portion of polyurethane, using unsaturated dicarboxylic acids such as fumaric acid, itaconic acid and norbornene dicarboxylic acid, and a maleic anhydride, which are capable of inducing cross-linking between polyurethane and the polymer polymerized from the vinyl monomer.

The vinyl monomer having unsaturated group(s) is included in an amount of 0.1 to 80% by weight, based on the total weight of the polishing pad.

Polyurethane constituting the polishing pad is composed of the main material and curing agent. As used herein, the main material refers to a prepolymer which is prepared by reaction of a polyol with diisocyanate, and the curing agent refers to an active hydrogen-containing compound which may include, for example polyols, amines, diols and mixtures thereof.

The polyol that may be used as a constituent component of the main material and curing agent is at least one polyol selected from the group consisting of polyether polyol, polyester polyol, polycarbonate polyol, acryl polyol, polybutadiene polyol, polyisoprene polyol, polyester-ether polyol, urea-dispersed polyol and polymer polyol.

The polyol has a functionality of 1 to 8, and a molecular weight of preferably 50 to 20,000 and more preferably 500 to 5,000.

Diisocyanate that may be used in the present invention is at least one aromatic di-isocyanate selected from the group consisting of 4,4'-phenylmethane diisocyanate, 2,6- or 2,4-toluene diisocyanate, carbodiimide-modified phenylmethane diisocyanate and polymeric phenylmethane diisocyanate, at least one cycloaliphatic diisocyanate selected from the group consisting of 4,4'-cyclohexylmethane diisocyanate, isophorone diisocyanate and 1,4-cyclohexylmethane diisocyanate, or mixed diisocyanates thereof.

The curing agent that may be used in the present invention is at least one aromatic amine selected from the group consisting of 3,3'-dichloro-4,4'-diaminophenylmethane and 4,4'-diaminobiphenyl, or at least one polyhydric alcohol selected from the group consisting of 1,4-butanediol, 1,6-hexanediol, diethyleneglycol, ethyleneglycol, tripropyleneglycol, glycerin, trimethylenepropane, sorbitol and sucrose.

The polyurethane polishing pad of the present invention has a density of 1.0 to 1.5 g/cm$^3$ and a Shore D hardness of 30 to 80.

BRIEF DESCRIPTION OF THE DRAWINGS

The above and other objects, features and other advantages of the present invention will be more clearly understood from the following detailed description taken in conjunction with the accompanying drawings, in which:

FIGS. 1a and 1b are SEMs of a polyurethane polishing pad according to Example 1 of the present invention, taken at magnifications of 500× (1a) and 100× (1b), respectively;

FIG. 2 is a graph showing measurement results of viscoelasticity behavior over temperature of polishing pads prepared in Example 2 of the present invention and Comparative Examples 1 and 2; and FIG. 3 is a graph showing changes of hardness over time, upon impregnation of polishing pads prepared in Examples 2 and 3 of the present invention and Comparative Examples 1 and 2 with a slurry.

MODE FOR THE INVENTION

Hereinafter, the present invention will be described in more detail.

Polyurethane refers to a general term of polymers having urethane group(s) formed via reaction of isocyanate groups with hydroxyl groups, and is a high-molecular weight material that is widely used for desired applications in diverse fields. Polyurethane that may be utilized in the present invention is primarily prepared by mixing of a main material with a curing agent. Polyurethane may be prepared using commercially available methods such as a solution polymerization method, a bulk polymerization method and the like. A prepolymer method, one of the bulk polymerization methods, is preferred to prepare polyurethane.

As the main material, the present invention employs a prepolymer having isocyanate groups at ends thereof, via reaction of a polyol with diisocyanate. Herein, the isocyanate-terminated prepolymer has a functionality of 1 to 8, preferably 2.

As examples of polyols that can be used in the present invention, mention may be made of polyether polyol, polyester polyol, polycarbonate polyol, acryl polyol, polybutadiene polyol, polyisoprene polyol, polyester-ether polyol and urea-dispersed polyol and polymer polyol.

The polyol has a weight-average molecular weight of about 50 to 20,000, preferably 500 to 5,000, and a functionality of 1 to 8, preferably 2. If the molecular weight of the polyol is less than 50, the hardness can be easily elevated to the desired level while it is difficult to control reactivity thereof, and an increased viscosity is accompanied by difficulties in mixing of the main material and curing agent. In addition, the higher molecular weight of the polyol provides easier control of reactivity, but presents difficulties to increase hardness thereof. Therefore, in order to meet all requirements concerning hardness, reactivity and manufacturability, it is preferred to use the polyol having the weight-average molecular weight of 50 to 5,000.

Diisocyanate that can be used in the present invention may include aromatic di-isocyanates such as 4,4'-phenylmethane diisocyanate (MDI), 2,6- or 2,4-toluene di-isocyanate (TDI) and carbodiimide-modified MDI, and cycloaliphatic diisocyanates such as 1,4-cyclohexylmethane diisocyanate (CHDI). In addition, any compound having isocyanate groups at both ends thereof may be used to prepare the urethane prepolymer of the present invention.

The prepolymer of the present invention is cured by mixing with the curing agent. As the curing agent, the present invention may employ a aromatic amines or polyhydric alcohols or thereof mixture to increase hardness of the prepolymer, or a mixture of polyols to decrease hardness of the prepolymer.

Examples of the aromatic amines that can be used in the present invention may include 3,3'-dichloro-4,4'-diaminophenylmethane (MOCA), 4,4'-diaminodiphenylmethane, 1,4-diaminobenzene, 4,4'-diaminobiphenyl and 3,3'-dichloro-4,4'-diaminobiphenyl. Examples of the polyhydric alcohol having functionality of more than 2 may include 1,4-butanediol, 1,6-hexanediol, diethyleneglycol, ethyleneglycol, tripropyleneglycol, glycerin, trimethylenepropane, sorbitol and sucrose.

The polyol used as the curing agent may be selected from polyols that can serve as the constituent component of the main material, and may be identical to or different from that is used as the constituent component of the main material or may be used in any combination thereof.

In the preparation of the main material and curing agent, gas bubbles are completely removed from the solution of the main material and curing agent, using a de-foaming agent and/or a de-foaming process. There is no particular limit to the de-foaming agent which may therefore be any agent conventionally used in the art to which the present invention pertains. Complete removal of gas bubbles affords a bubble-free polishing pad and the-thus obtained polishing pad has a high density.

The urethane matrix in which gas bubbles were included has suffered from density difference from part to part, which consequently results in unstable polishing efficiency of the pad within or between lots, depending upon different densities thereof. However, complete removal of bubbles, as disclosed in the present invention, can prevent occurrence of density differences between the respective corresponding parts of the urethane matrix, thus being capable of producing products having a consistent density within/between lots, and it is also possible to achieve improvements in polishing efficiency and rate by the cross-linked polymer.

Using a radical catalyst, a liquid vinyl monomer having unsaturated group(s) and optionally vinyl oligomer are polymerized with the polyurethane matrix composed of the main material and curing agent, such that the vinyl monomer and oligomer are interpenetrated and crosslinked with the polyurethane matrix.

For this purpose, the vinyl monomer and optionally the vinyl oligomer are previously mixed with the main material or curing agent. In this case, the mixed main material and curing agent undergo urethane reaction which also progresses simultaneously with radical reaction involving formation of a vinyl polymer, and the resulting vinyl polymer is then interpenetrated and crosslinked with polyurethane. By previously mixing the liquid vinyl monomer or oligomer with the main material or curing agent, it is possible to alleviate disadvantages such as poor density and instability of physical properties due to uneven dispersion, as exhibited by conventional arts involving addition of heterogeneous materials to urethane. In addition, it is also possible to achieve a structure which is more stable against heat and solubility in slurry, via the formation of urethane cross-linked and polymer cross-linked structures. The above radical polymerization reaction takes place concurrently with polyurethane reaction, and the liquid vinyl oligomer may be further added thereto.

The vinyl monomer used herein may be a compound having at least one unsaturated group therein. Examples of the vinyl monomers having at least one unsaturated group include vinyl monomers such as styrene, acrylonitrile, methylacrylonitrile, alpha-methylstyrene, methylstyrene and butylstyrene; unsaturated monocarboxylic acids such as acrylic acid, methacrylic acid, fumaric acid and itaconic acid; and acrylates such as methylacrylate, 2-hydroxypropylacrylate, methyl methacrylate, 2-hydroxymethyl methacrylate and isopropyl methacrylate. That is, there is no particular limit to vinyl monomers that can be used in the present invention, so long as they are unsaturated vinyl monomers.

The radical catalyst, which is used for the polymerization of the vinyl monomer having unsaturated group(s) and optionally the vinyl oligomer into a polymer, may include peroxides, percarbonates and azo compounds. As specific examples of the radical catalyst, mention may be made of benzoyl peroxide, decanoyl peroxide, t-butyl peroctoate, di-t-butyl peroxide, cumene hydroperoxide, propylhydroperoxide, isopropyl hydroperoxide, t-amyl-2-ethylhexanoate, 2,2'-azo-bis-(iso-butyronitrile) and 2,2'-azo-bis-(2-methylbutane-nitrile). Polymerization of the monomers into polymers usually employs monomers having a half life of not more than 1 min at a polymerization temperature, and the monomers are used in an amount of 0.5 to 5% by weight, based on the total weight of reaction materials.

In addition, it is also possible to induce binding of the-thus obtained polymer with a portion of polyurethane, using unsaturated dicarboxylic acids such as fumaric acid, itaconic acid and norbornene dicarboxylic acid, and a maleic anhydride, which are capable of inducing crosslinking between polyurethane and the vinyl polymer formed by radical polymerization of the liquid vinyl monomer and optionally the vinyl oligomer.

Hereinafter, manufacturing of a polishing pad using the above-prepared urethane will be described.

A main material and a curing agent are mixed at a temperature of 0 to 150° C. Even though a longer mixing time is advantageous, 10 to 500 seconds are sufficient in terms of productivity and reactivity. Preferably, reactants may be mixed in the range of 40 to 200 seconds. After previous mixing of the main material or curing agent with an unsaturated group-containing vinyl monomer and optionally vinyl oligomer, the main material and curing agent are mixed to allow for urethane reaction simultaneously with radical-induced polymerization. The mixed reactants are fed into a mold having a pre-determined shape (usually, circular-shaped), thereby preparing a polyurethane block which is utilizable as the polishing pad. The thus-prepared polyurethane block is completely cured by aging it at a temperature of 80 to 140° C. for 24 hours. The aging time and temperature may be appropriately adjusted depending upon kinds of isocyanate, polyol and vinyl polymer to be used.

The polyurethane block thus prepared is subjected to suitable mechanical slicing, cutting or polishing to thereby prepare a polishing pad meeting standard requirements. When pore- or gas bubble-free, flat urethane sheet in which the thus-formed vinyl polymer was interpenetrated and crosslinked with the polyurethane matrix is obtained, the polyurethane surface is processed to form grooves and/or micro holes by a conventional method, preferably laser irradiation. It is sufficient to achieve desired surface morphology if micro holes have a size of 10 to 500 μm and a pitch of 30 to 2,000 μm, and it is preferred that micro holes are uniformly formed on the surface of the pad. In order to ensure smooth discharge and flow of the slurry used during the CMP process, the pad is surface-treated to form grooves by laser irradiation. Further, in order to relieve impact applied to the pad during the CMP process, a cushion pad is applied to the backside of the polishing pad via laminate adhesion using a double-sided adhesive tape, thereby manufacturing a final product.

EXAMPLES

Now, the present invention will be described in more detail with reference to the following examples. These examples are provided only for illustrating the present invention and should not be construed as limiting the scope and spirit of the present invention.

Example 1

This example is intended to prepare a vinyl oligomer. 0.2% by weight of azobisisobutyronitrile and 44% by weight of a 70:30 mixture of styrene and acrylonitrile were added to a mixing vessel to which 12% by weight of isobutyl alcohol as a chain-transfer solvent was then added. Thereafter, 43.6% by weight of xylene as a chain-transfer solvent and 0.2% by weight of azobisisobutyronitrile as a radical catalyst were added to the reaction vessel.

Moisture was removed from the reaction vessel to which the mixture of the mixing vessel was then added in a gaseous phase over 2 hours to allow for polymer polymerization. After addition of the mixture was complete, the reactants were aged for 1 hour under the same conditions. After aging of the vinyl monomer was complete, the remaining unreacted styrene and acrylonitrile monomers were removed under reduced pressure.

The thus-obtained vinyl oligomer is a liquid styrene-acrylonitrile co-oligomer having a molecular weight of less than 50,000 and a viscosity of 20,000 cps/50° C., thus exhibiting liquid-like fluidity.

Example 2

100 g of a polyether polyol (functionality=2, and Mw=1000) was charged into a vessel to which 51.2 g of 4,4'-phenylmethane diisocyanate (MDI) was then added. The temperature of the reaction vessel in which two solutions were mixed was elevated to 80° C. and the mixture was reacted with stirring for 3 hours, thereby preparing a prepolymer having isocyanate groups at both ends thereof (Main material #1).

300 g of 4,4'-methylenebis(o-chloroaniline) was charged into a vessel to which 100 g of a polyether polyol was then added. Herein, the temperature of the mixing vessel was maintained in a range not exceeding 130° C. Then, the defoaming process was carried out with mixing for more than 3 hours to completely remove the remaining gas bubbles from the solution, thereby preparing a curing agent (curing agent #1). The resulting curing agent was mixed with the styrene-acrylonitrile co-oligomer synthesized in Example 1: styrene monomer:acrylonitrile (50 g:50 g:50 g).

The above-prepared main material and curing agent were mixed in a urethane reaction equivalent ratio of 1:1 at 80° C. and the resulting mixture was poured into a pan-type open mold. Immediately prior to mixing of the main material and curing agent, 0.1 g of benzoyl peroxide as an initiator catalyst for radical polymerization was added to the curing agent. Reactants were mixed for 1 min at 1000 rpm. The reaction product was released from the mold 30 min later, and was left to be aged at 80° C. for 24 hours, thereby resulting in complete reaction.

The polyurethane thus prepared had a density of 1.145 g/cm$^3$ and a Shore D hardness of 70. The thus-prepared polyurethane block was cut into 20 inch slices, surfaces of which were then processed to form micro holes (hole size: 180 μm and pitch: 30 μm) and grooves via laser irradiation. Thereafter, a cushion pad was applied to the backside of the polishing pad via laminate adhesion using a double-sided adhesive tape, thereby manufacturing a final pad product.

FIG. 1 shows an SEM of the polyurethane polishing pad prepared as above. As can be seen from FIG. 1, the above-mentioned method afforded the polishing pad having an interpenetrating network structure of a vinyl monomer and oligomer with a polyurethane matrix, with confirmation of no formation of any other pores or gas bubbles.

The above-prepared polishing pad was given a performance test. The chemical-mechanical polishing (CMP) process was carried out using a CMP tool (IPEC-472, available from TEC) and a silica slurry as a CMP slurry (Starplanar-4000, available from Cheil Industries Inc., Korea), at a flow rate of 200 ml/min. a polishing load of 7 psi, a polishing pad rotation rate of 46 rpm and a wafer rotation speed of 38 rpm.

In this manner, the within-wafer uniformity, average polishing rate, amount of polishing scratches and wear rate of the polishing pad were measured. The results thus obtained are given in Table 1 below. In addition, thermal stability and slurry solubility of the polishing pad were tested. The results thus obtained are shown in FIGS. 2 and 3, respectively.

Example 3

In order to prepare a main material, 100 g of a polyether polyol (functionality=2, and Mw=1000) was charged into a vessel to which 51.2 g of MDI was then added. The reaction vessel in which two solutions were mixed was maintained at 80° C. for 3 hours under stirring, thereby preparing a prepolymer having isocyanate groups at both ends thereof.

In order to prepare a curing agent, 300 g of 4,4'-methylenebis(o-chloroaniline) was charged into a vessel to which 100 g of a polyether polyol was then added. Herein, the temperature of the mixing vessel was maintained in a range not exceeding 130° C. Thereafter, the defoaming process was carried out with mixing for more than 3 hours to completely remove the remaining gas bubbles from the solution, thereby preparing a curing agent. In this Example, 200 g of a liquid styrene monomer was mixed.

The above-prepared main material and curing agent were mixed in a urethane reaction equivalent ratio of 1:1 at 80° C. and the resulting mixture was poured into a pan-type open mold. Immediately prior to mixing of the main material and curing agent, 0.1 g of benzoyl peroxide as an initiator catalyst for radical polymerization was added to the curing agent. Reactants were mixed for 1 min at 1000 rpm. The reaction product was released from the mold 30 min later, and was left to be aged at 80° C. for 24 hours, thereby resulting in complete reaction.

The polyurethane thus prepared had a density of 1.14 g/cm$^3$ and a Shore D hardness of 68. The thus-prepared polyurethane block was cut into 20 inch slices, surfaces of which were then processed to form micro holes (hole size: 180 μm, and pitch: 300 μm) via laser irradiation. Thereafter, a cushion pad was applied to the backside of the polishing pad via laminate adhesion using a double-sided adhesive tape, thereby manufacturing a final pad product.

Wafer-polishing performance and slurry solubility of the thus-prepared polishing pad were tested in the same manner as in Example 2. The results thus obtained are given in Table 1 and FIG. 3, respectively.

Comparative Example 1

In order to prepare a main material, 100 g of a polyether polyol (functionality=2, and Mw=1000) was charged into a vessel to which 51.2 g of MDI was then added. The reaction vessel in which two solutions were mixed was maintained at 80° C. for 3 hours under stirring, thereby preparing a prepolymer having isocyanate groups at both ends thereof.

In order to prepare a curing agent, 300 g of 4,4'-methylenebis(o-chloroaniline) was charged into a vessel to which 100 g of a polyether polyol was then added. Herein, the temperature of the mixing vessel was maintained in a range not exceeding 130° C. Thereafter, the defoaming process was carried out with mixing for more than 3 hours to completely remove the remaining gas bubbles from the solution, thereby preparing a curing agent. This Comparative Example did not include a polymer formed from a liquid vinyl monomer and/or a vinyl oligomer.

The polyurethane thus prepared has a density of 1.145 g/cm$^3$ and a Shore D hardness of 68. The thus-prepared polyurethane block was cut into 20 inch slices, surfaces of which were then processed to form micro holes (hole size: 180 μm, and pitch: 300 μm) via laser irradiation. Thereafter, a cushion pad was applied to the backside of the polishing pad via laminate adhesion using a double-sided adhesive tape, thereby manufacturing a final pad product.

Wafer-polishing performance of the thus-prepared polishing pad was tested in the same manner as in Example 2. The results thus obtained are given in Table 1 below.

Comparative Example 2

500 parts by weight of a polyether prepolymer (Adiprene L-325, NCO content 2.2 meq/g, available from Uniroyal) and 13 g of Expancel 551DE (hollow microspheres consisting of a vinylidene chloride-acrylonitrile copolymer) were mixed in a vessel, followed by defoaming under reduced pressure. Thereafter, 145 g of 4,4'-methylenebis(o-chloroaniline) previously melted at 120° C. was added with stirring to obtain a mixture. The resulting mixture was stirred for about 1 min and was poured into a pan-type open mold which was then aged in an oven at 100° C. for 6 hours, thereby obtaining a polyurethane microfoam block (cell diameter: 40 μm). The thus-obtained polyurethane microfoam block had a density of 0.75 g/cm$^3$. This Comparative Example did not include formation of micro holes via a laser process.

Wafer-polishing performance, slurry solubility and thermal stability of the thus-prepared polishing pad were tested in the same manner as in Example 2. The results thus obtained are given in Table 1 and FIGS. 2 and 3, respectively.

Average Polishing Rate

For evaluation of the average polishing rate, an 8-inch silicon wafer, on which a thermal oxide film was deposited to a thickness of 1 μm, was polished under the same polishing conditions as in Example 2 and the average polishing rate for 1-min polishing was measured.

Within-Wafer Uniformity

For evaluation of the within-wafer uniformity, an 8-inch silicon wafer, on which a thermal oxide film was deposited to a thickness of 1 μm, was polished for 1 min under the same polishing conditions as in Example 2, and the within-wafer thickness was measured at 98 positions. Based on these measurement values, the within-wafer uniformity was calculated according to the following equation:

Within-wafer uniformity (%)={(maximum thickness of the film−minimum thickness of the film)/(2× average thickness of the film)}×100

Scratches

For evaluation of the scratches, an 8-inch silicon wafer, on which a thermal oxide film was deposited to a thickness of 1 μm, was polished for 1 min under the same polishing conditions as in Example 2, and washed and dried. Thereafter, the number of microscratches that had occurred in one wafer sheet was measured using KLA (Model: KLA2112, available from KLA Tencor). The smaller number of scratches represents higher quality of the polishing pad and the number of scratches should not exceed 500 for commercial requirements of the polishing pad.

Measurement of Abrasion Loss

For evaluation of the abrasion loss, the wear depth of the test sample was measured using Taber Abrasion Tester, with an abrasive wheel H-22 at 2×500 g load, 100 rpm, and 2000 revolutions. The poorer abrasion performance results in the deeper wear depth.

Test of Thermal Stability

For evaluation of the thermal stability, the viscoelasticity behavior over temperature of the polishing pad was measured at a mechanical vibration of 1 Hz, according to DMA (Dynamic Mechanical Analysis). The results thus obtained are given in FIG. 2.

Test of Solubility in Slurry

For this purpose, the pads prepared in Examples 2 and 3 and Comparative Examples 1 and 2 were impregnated in slurry and a decrease of hardness over time was measured. The test results thus obtained are given in FIG. 3.

TABLE 1

| | Hardness (Shore D) | Density (g/cm$^3$) | Within-wafer uniformity (%) | Average polishing rate (A/min) | Scratches (number/wafer) | Abrasion loss (mm) |
|---|---|---|---|---|---|---|
| Ex. 2 | 70D | 1.145 | Less than 4.0% | 2700 | 70 | 0.190 |
| Ex. 3 | 68D | 1.14 | Less than 4.5% | 2650 | 85 | 0.210 |
| Comp. Ex. 1 | 68D | 1.145 | Less than 5.0% | 2450 | 130 | 0.284 |
| Comp. Ex. 2 | 55D | 0.75 | Less than 5.5% | 2550 | 145 | 0.520 |

As shown in Table 1, it can be seen that the polishing pad obtained according to the present invention exhibits higher hardness and density, as compared to Comparative Example 2, and has superior values in the average polishing rate, within-wafer uniformity and scratches, and significantly superior abrasion performance, as compared to Comparative Examples 1 and 2.

From these results, it can be seen that due to the absence of gas bubbles in the pad and uniform distribution of an interpenetrating network structure of a vinyl polymer, formed via radical polymerization of a vinyl monomer and optionally a vinyl oligomer, with a polyurethane matrix, the polishing pad of the present invention provides improved polishing rate and within-wafer uniformity, and significantly superior abrasion performance, thereby resulting in the prolonged service life of the pad, as well as inhibition of scratch generation due to abrasion of the pad during polishing processes.

FIG. 2 is a DMA (Dynamic Mechanical Analysis) graph showing decreases in the elastic modulus over temperature, for polishing pads prepared in Example 2 of the present invention and Comparative Examples 1 and 2. As shown in FIG. 2, it can be seen that the polishing pads of Comparative Examples 1 and 2 maintain the elastic modulus at a consistent level until a temperature of 20° C., but exhibit a gradual decrease of the elastic modulus after that temperature. However, the polishing pad prepared in Example 2 of the present invention exhibited substantially no change in the elastic modulus over temperature.

FIG. 3 is a graph showing changes of hardness over time, upon impregnation of polishing pads, prepared in Examples 2 and 3 and Comparative Examples 1 and 2, into the slurry. As shown in FIG. 3, it can be seen that the polishing pads of the present invention exhibit an insignificant decrease in hardness due to slurry impregnation and as a result, a minor decrease in the polishing efficiency due to decreased hardness resulting from contact with the slurry.

INDUSTRIAL APPLICABILITY

The present invention provides a polishing pad exhibiting substantially no change in a polishing rate due to frictional heat and contact with polishing slurry during the CMP process, by minimizing changes in hardness resulting from heat and contact with the slurry, via an interpenetrating network structure of a vinyl polymer, formed via radical polymerization, with a polyurethane which is used as a matrix of the polishing pad. Further, use of a liquid vinyl monomer and optionally a vinyl oligomer results in no occurrence of poor dispersion and density difference as normally exhibited upon mixing of different kinds of materials and enables production of stable products due to uniform dispersibility thereof in terms of a molecular structure. Further, according to the present invention, the interpenetrating network structure of the vinyl polymer formed via radical polymerization with the polyurethane matrix leads to improved polishing rate and planarity, and remarkably extended abrasion performance of the pad, thereby providing a polishing pad with an increased service life.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A pore/gas bubble-free, polyurethane polishing pad having an interpenetrating network structure, wherein vinyl polymer obtained through radical polymerization of vinyl monomer and optionally of vinyl oligomer, which are liquid at a room temperature, is interpenetrated into and cross-linked with polyurethane during polyurethane polymerization of main material and curing agent, by addition of the vinyl monomer and optionally of the vinyl oligomer into at least one of the main material and the curing agent.

2. The polishing pad according to claim 1, wherein the vinyl monomer and vinyl oligomer contain at least one unsaturated group.

3. The polishing pad according to claim 2, wherein the vinyl monomer having at least one unsaturated group is at least one monomer selected from the group consisting of vinyl monomers such as styrene, acrylonitrile, methylacrylonitrile, alpha-methylstyrene, methylstyrene and butylstyrene; unsaturated monocarboxylic acids such as acrylic acid, methacrylic acid, fumaric acid and itaconic acid; and acrylates such as methylacrylate, 2-hydroxypropylacrylate, methyl methacrylate, 2-hydroxymethyl methacrylate and isopropyl methacrylate.

4. The polishing pad according to claim 1, wherein a radical catalyst used in radical polymerization is at least one selected from the group consisting of benzyl peroxide, decanoyl peroxide, t-butyl peroctoate, di-t-butyl peroxide, cumene hydroperoxide, propylhydroperoxide, isopropyl hydroperoxide, t-amyl-2-ethylhexanoate, 2,2'-azo-bis-(isobutyronitrile) and 2,2'-azo-bis-(2-methylbutane-nitrile).

5. The polishing pad according to claim 1, wherein the content of the vinyl polymer in the pad is in the range of 0.1 to 80% by weight, based on the total weight of the polishing pad.

6. The polishing pad according to claim 1, wherein the polishing pad has a density of 1.0 to 1.5 g/cm$^3$ and a Shore D hardness of 30 to 80.

7. The polishing pad according to claim 1, wherein the main material is a prepolymer produced by polymerization of a polyol with diisocyanate, or isocyanate.

8. The polishing pad according to claim 7, wherein the polyol is at least one polyol selected from the group consisting of polyether polyol, polyester polyol, polycarbonate polyol, acryl polyol, polybutadiene polyol, polyisoprene polyol, polyester-ether polyol, urea-dispersed polyol and polymer polyol.

9. The polishing pad according to claim 7, wherein the polyol has a functionality of 1 to 8, and a weight-average molecular weight of 50 to 20,000.

10. The polishing pad according to claim 7, wherein the diisocyanate is at least one aromatic diisocyanate selected from the group consisting of 4,4'-phenylmethane diisocyanate, 2,6- or 2,4-toluene diisocyanate, carbodiimide-modified phenylmethane diisocyanate and polymeric phenylmethane diisocyanate, at least one cycloaliphatic diisocyanate selected from the group consisting of 4,4'-cyclohexylmethane diisocyanate, isophorone diisocyanate and 1,4-cyclohexylmethane diisocyanate, or mixed diisocyanates thereof.

11. The polishing pad according to claim 1, wherein the curing agent is at least one aromatic amine selected from the group consisting of 3,3'-dichloro-4,4'-diaminophenylmethane, 4,4'-diaminodiphenylmethane, 1,4-diaminobenzene, 4,4'-diaminobiphenyl and 3,3'-dichloro-4,4'-diaminobiphenyl, or at least one polyhydric alcohol selected from the group consisting of 1,4-butanediol, 1,6-hexanediol, diethyleneglycol, ethyleneglycol, tripropyleneglycol, glycerin, trimethylenepropane, sorbitol and sucrose.

12. The polishing pad according to claim 1, wherein the surface of the polyurethane polishing pad is processed to form grooves and/or micro holes by laser irradiation.

* * * * *